United States Patent
Sandionigi et al.

(10) Patent No.: US 10,102,322 B2
(45) Date of Patent: Oct. 16, 2018

(54) COMPUTER IMPLEMENTED METHOD FOR BEHAVIOR ANALYSIS OF AN INTEGRATED CIRCUIT COMPRISING PATHS SELECTION BASED ON AN AGGREGATION CRITERION AND PREDEFINED ANALYSIS STRATEGY

(71) Applicant: COMMISSARIAT A L'ENERGIE ATOMIQUE ET AUX ENERGIES ALTERNATIVES, Paris (FR)

(72) Inventors: Chiara Sandionigi, Paris (FR); Olivier Heron, Bullion (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 49 days.

(21) Appl. No.: 14/914,621

(22) PCT Filed: Sep. 3, 2014

(86) PCT No.: PCT/EP2014/068760
§ 371 (c)(1),
(2) Date: Feb. 25, 2016

(87) PCT Pub. No.: WO2015/032830
PCT Pub. Date: Mar. 12, 2015

(65) Prior Publication Data
US 2016/0203249 A1    Jul. 14, 2016

(30) Foreign Application Priority Data
Sep. 5, 2013  (FR) .................................. 13 58531

(51) Int. Cl.
*G06F 17/50* (2006.01)
(52) U.S. Cl.
CPC ...... *G06F 17/5036* (2013.01); *G06F 17/5081* (2013.01); *G06F 2217/84* (2013.01)

(58) Field of Classification Search
CPC .......................... G06F 17/5036; G06F 17/5081
See application file for complete search history.

(56) References Cited

U.S. PATENT DOCUMENTS

| | | | |
|---|---|---|---|
| 7,251,800 B2 * | 7/2007 | McElvain | ........... G06F 17/5031 716/112 |
| 7,458,049 B1 * | 11/2008 | Tuncer | ................ G06F 17/5031 703/13 |

(Continued)

OTHER PUBLICATIONS

O. Heron et al., "On the simulation of HCI-induced variations of IC timings at high level," Journal of Electronic Testing, 2013, vol. 29, No. 2, pp. 127-141.

(Continued)

*Primary Examiner* — Stacy Whitmore
(74) *Attorney, Agent, or Firm* — Baker & Hostetler LLP

(57) ABSTRACT

A method implemented by computer, for selecting representative paths for the analysis of the behavior of an integrated circuit according to a predefined analysis strategy, comprises the identification of the set of paths of the integrated circuit having logic gates and the construction of a list of the set of the paths. The method comprises: the selection of several criteria related to the behavior of the integrated circuit, chosen from among the following types: topology, usage, sensitivity, environment, criticality; the determination of values of the selected criteria for each of the identified paths; the application of a correlation function to aggregate the set of the values of criteria to define an aggregation criterion value; and the selection of a subset of representative paths from among the list of the paths, as a function of the value of the aggregation criterion of the paths and of the predefined analysis strategy.

20 Claims, 2 Drawing Sheets

(56) References Cited

U.S. PATENT DOCUMENTS

| | | | |
|---|---|---|---|
| 7,721,236 B2* | 5/2010 | Hwang | G06F 17/5031 716/113 |
| 8,418,119 B2 | 4/2013 | Case et al. | |
| 2004/0243964 A1* | 12/2004 | McElvain | G06F 17/5031 716/112 |
| 2009/0327986 A1* | 12/2009 | Goswami | G01R 31/318547 716/108 |
| 2011/0191080 A1* | 8/2011 | Klie | G06F 17/50 703/10 |
| 2013/0010601 A1 | 1/2013 | Senarath et al. | |
| 2014/0108449 A1* | 4/2014 | Peloski | G06F 17/5009 707/769 |

OTHER PUBLICATIONS

C. Sandionigi et al., "When processors get old: Evaluation of BTI and HCI effects on performance and reliability," IEEE Int. On-Line Testing Symposium, pp. 185-186, Jul. 2013.

C. Bertolini et al., "Relation between HCI-induced performance degradation and applications in a RISC processor," 2012 IEEE 18th International On-Line Testing Symposium (IOLS), Jun. 27, 2012, pp. 67-72, XP032243081.

V. Huard et al., "A predictive bottom-up hierarchical approach to digital system reliability," 2012 IEEE International Reliability Physics Symposium (IRPS), Apr. 15, 2012, pp. 4B.1.1-4B.1.10, XP032204916.

* cited by examiner

COMPUTER IMPLEMENTED METHOD FOR
BEHAVIOR ANALYSIS OF AN INTEGRATED
CIRCUIT COMPRISING PATHS SELECTION
BASED ON AN AGGREGATION CRITERION
AND PREDEFINED ANALYSIS STRATEGY

CROSS-REFERENCE TO RELATED
APPLICATIONS

This application is a National Stage of International patent application PCT/EP2014/068760, filed on Sep. 3, 2014, which claims priority to foreign French patent application No. FR 1358531, filed on Sep. 5, 2013, the disclosures of which are incorporated by reference in their entirety.

FIELD OF THE INVENTION

The field of the invention is that of the design of integrated circuits comprising in particular the compilation of the netlist of an integrated circuit, this netlist corresponding to a list of sets of logic gates and of their interconnections which constitute a circuit, and which is commonly designated by the term path.

BACKGROUND

In current integrated circuits, the netlist is ever more complex. Consequently, there is an ever larger number of paths to be considered during the development of the circuit. The complexity of the netlist leads to long development lags.

Moreover, the analysis of the circuit is often not possible at the level of abstraction of the netlist. For example, the exploration of the design of the circuit on the basis of several constraints is always performed on the basis of Register Transfer Level, which is a higher level of abstraction where the circuit is simplified.

Now, when specific analyses of the circuit are performed (for example, during exploration to identify the best solution on the basis of one or more metrics, also dubbed criteria), it may not be necessary to examine all the paths of the netlist, a subset of paths may be sufficient to represent the analyzed behavior.

Also, the identification of a subset of paths representative of the behavior of the circuit is necessary when it is desired to monitor the operation of the circuit, given the impossibility of monitoring all the paths.

Within this framework, the technical problem addressed by the present invention relates to the reducing of the number of paths of the netlist to be considered for the analysis or the on-line monitoring of the circuit, i.e. the selecting of a subset of paths representative of the behavior of the circuit on the basis of several criteria defined by the circuit designer.

Little literature relating to the selection of the paths of a netlist exists. Most works do not consider the netlist of an integrated circuit, for example, several works deal with the selecting of the paths in a network. It is in particular possible to cite the article by N. G. Senarath, D. Yu, H. Zhang, I. Bahceci, P. Zhu, W. Tong, "Path selection for a wireless system with relays", Patent No. US 2013/0010601 A.

When the netlist is considered, its simplification is often performed in terms of reduction of logic gates and not of paths: M. L. Case, J. R. Baumgartner, R. L. Kanzelman, H. Mony, "Logical circuit netlist reduction and model simplification using simulation results containing symbolic values", U.S. Pat. No. 8,418,119 B2.

A solution to the problem of the selecting of the paths of a netlist which has nonetheless already been proposed describes the identification of a path which maximizes or minimizes a criterion. The most common and well known example relates to the identification of the critical path of an integrated circuit, where the path having the longest propagation time is identified. The problem posed by solutions of this type is that the list of paths is reduced to a single path. Also a single metric is taken into account for the selection of the path.

Some of the Applicant's previous works, in particular described in the references hereinafter: C. Bertolini, O. Heron, N. Ventroux, F. Marc, "Relation between HCI-induced performance degradation and applications in a RISC processor", IEEE Int. On-Line Testing Symposium, 2012, pp. 67-72, 0. Heron, C. Bertolini, C. Sandionigi, N. Ventroux, F. Marc, On the simulation of HCl-induced variations of IC timings at high level", Journal of Electronic Testing, 2013, Vol. 29, N. 2, pp. 127-141, and C. Sandionigi, O. Heron, C. Bertolini, R. David, When processors get old: Evaluation of BTI and HCl effects on performance and reliability", IEEE Int. On-Line Testing Symposium, pages 185-186, July 2013, identify a path of the netlist on the basis of several criteria, while having a different aim from the selecting of the paths. The aim of these works is to analyze the temporal degradation of an integrated circuit. By considering the activity of the circuit and the lag of each path of the netlist (it being possible to consider these to be the two initial criteria), the works identify the path which is most sensitive to the degradation mechanisms. Solutions of this type do not make it possible to select a subset of paths representative of the behavior of the circuit so as to perform specific analyses.

In these articles, the aim sought is the evaluation of the temporal degradation of each path of the netlist so as to identify the most sensitive path. The criteria taken into account to characterize the netlist are the initial lag and the activity along the path. The method does not make it possible to define a strategy for selecting paths representative of the behavior of the circuit, which is the subject of the present invention. Consequently, the aim of accelerating the specific analyses or the on-line monitoring of the circuit cannot be achieved.

SUMMARY OF THE INVENTION

In this context, the subject of the present invention is a method comprising the selecting of the paths representative of the behavior of the circuit, performing in particular the following main tasks:

the aggregation of various types of criteria;
the extraction of a subset of paths.

More precisely, the subject of the invention is a method implemented by computer, for selecting representative paths for the analysis of the behavior of an integrated circuit according to a predefined analysis strategy, comprising the identification of the set of paths of said integrated circuit having logic gates and the construction of a list of the set of said paths, the method furthermore comprising the following steps:

the selection of several criteria related to the behavior of said integrated circuit, said several criteria being chosen from among the following types: topology, usage, sensitivity, environment, criticality;

the determination of values of the selected criteria for each of said identified paths;

the application of a correlation function so as to aggregate the set of said values of criteria in such a way as to define for each of said paths, an aggregation criterion value; and the selection of a subset of representative paths from among the list of the set of said paths, as a function of the value of the aggregation criterion of each of said paths and of the predefined analysis strategy.

According to a variant of the invention, the selection of a subset of paths is based on a threshold value, indicating the paths to be extracted with an associated value which is less than or greater than a specified threshold value.

According to a variant of the invention, the selection of a subset of paths is based on a maximum deviation value, indicating the paths to be extracted which are characterized by an aggregation value with a disparity which is less than a predefined threshold value with respect to the other paths.

According to a variant of the invention, the selection of a subset of paths is based on an average value, indicating the paths to be extracted which are characterized by an aggregation value which is close to the average of the values of all the paths.

According to a variant of the invention, the determination of each criterion value for each of said paths is carried out by simulation of said integrated circuit. The designer chooses the input data of the circuit. With the aid of simulation tools, the input values are propagated over each path of the circuit and the values of the selected criteria are determined by applying a calculation formula for the criterion.

According to a variant of the invention, the determination of each criterion value for each of said paths is carried out by the analysis of said circuit. In this case, the propagation of the input values is performed on the basis of an analytical study of the circuit. The functionality of the circuit is described in an analytical manner, for example by equations, which are applied so as to propagate the input values over each path and the values of the selected criteria are determined by applying a calculation formula for the criterion.

According to a variant of the invention, the criteria of topology type can be chosen from among: the lag of the circuit, corresponding to the propagation time of the input data or the performance.

According to a variant of the invention, the criteria of usage type can be chosen from among: the activity in terms of fraction of time during which a signal is at 1 (or 0) or in terms of number of switchings of the signal, or the power.

According to a variant of the invention, the criteria of sensitivity type can be chosen from among: the probability of failure of the logic gates or the technological parameters related to the degradation of the gates.

According to a variant of the invention, the criteria of environment type can be chosen from among the temperature of the environment or the exposure to radiations.

According to a variant of the invention, the criteria of criticality type can be chosen from among the gravity of the failure of the path on the operation of the circuit.

According to a variant of the invention, the method comprises the application of a correlation function of the predefined criteria, so as to determine said value of the aggregation criterion, said correlation function being able to be a function for calculating the lag of the paths subject to thermal degradation mechanisms.

According to a variant of the invention, the method comprises a prior step of selecting false paths, said false paths corresponding to paths being unable to propagate a signal.

The subject of the invention is also a computer program comprising instructions for the execution of the method for analyzing the behavior of an integrated circuit implemented by computer according to the invention.

The subject of the invention is further a system for designing an integrated circuit comprising a calculation unit implementing the method for analyzing the behavior of an integrated circuit implemented by computer according to the invention.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
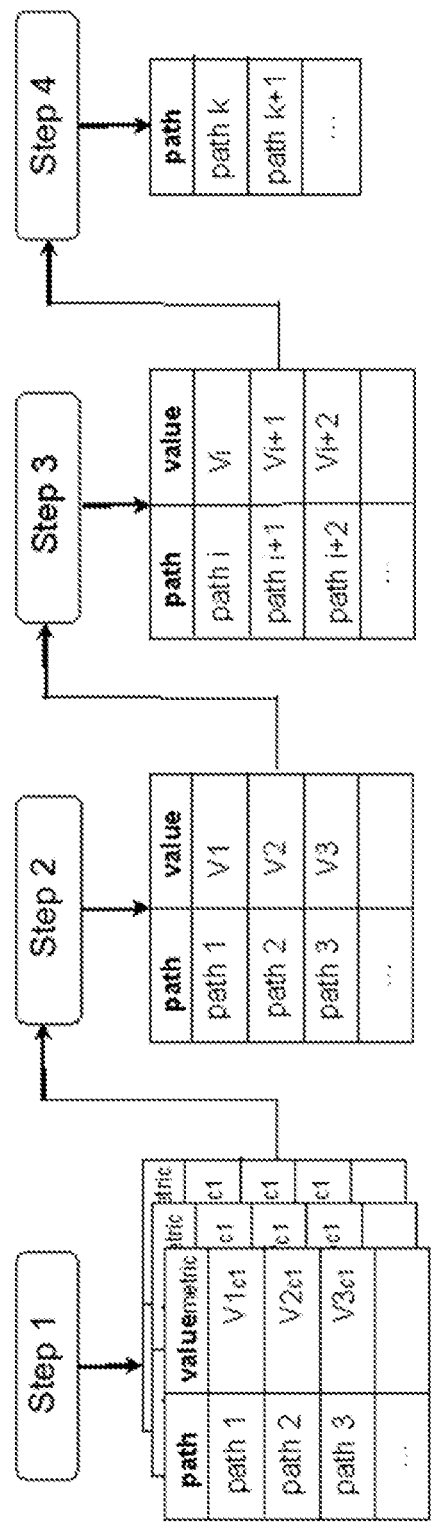
FIG. 1 illustrates the main steps of the method of selection of the invention.

The novel and inventive character of the method proposed in the present invention relies on the mode of selection of the paths of the netlist of the integrated circuit.

Selection by taking account of several criteria and on the basis of a predefined strategy renders the proposed solution more satisfactory than the solutions of the known art since it makes it possible to identify the paths representative of the behavior of the circuit.

In fact, the subset of paths which is obtained is the list of paths to be considered so as thereafter to perform specific analyses or to monitor the operation of the circuit, according in particular to the type of criterion selected.

Generally, the method of the invention comprises beforehand and in a known manner the description of the integrated circuit so as to establish the netlist of the paths thereof.

For each of the paths, a certain number of criteria are defined, belonging to at least two different types (topology, usage, sensitivity, environment, criticality), these criteria being able to be more precisely: the lag of the circuit or the performance in respect of topology; the activity of the circuit in respect of usage; the probability of failure or the technological parameters related to the degradation of the logic gates in respect of sensitivity; the temperature or the exposure to radiations in respect of environment; the gravity of the failure of the path on the operation of the circuit in respect of criticality.

Thus, the invention consists of a method making it possible to perform a selecting of the paths of an integrated circuit making it possible to represent the overall behavior of the circuit. On the basis of the netlist of the circuit and by considering several criteria, to which a cost function is applied, a subset of paths representative of the behavior of the circuit is selected.

The method takes as input first tables which associate a value for each path and each criterion.

On the basis of the set of these first tables, and application of a cost function, leading to the determination of values of the aggregation criterion, a second table is defined, cataloging for each path, the value determined of the aggregation criterion.

It is then possible to undertake the selection of a subset of paths, on the basis of a selection made on said values, which may have been previously ranked, of the aggregation criterion.

By thus using the reduction of the list of paths of the netlist, the main technical advantage is the reduction of the time for specific analyses of the netlist. This advantage can be utilized during the development of the circuit and after its production.

Another advantage is the possibility of performing the on-line monitoring of the circuit, which is not feasible for a list of numerous paths.

The potential industrial fields of application of the present method of the invention are all those related to the development and management of complex circuits.

Indeed, the proposed method may be of interest in the development of complex circuits with various constraints, such as reliability, performance and power. This complex circuit type often requires an exploration phase to identify the best solution in terms of "trade-off" corresponding to the compromise between the metrics considered. To find the best solution, one defines an objective function, which is a function of the selected criteria. The best solution is the solution which best meets the objective function. The exploration is always executed at high level of abstraction, in general on the basis of Register Transfer Level. The invention makes it possible to reduce the list of paths to be analyzed during the exploration, thus making it possible to perform the exploration at the netlist level.

The method of the invention can also advantageously be applied during the monitoring of the circuit, for example to verify the reliability thereof or to measure the performance thereof, using the reduction of the list of paths to be monitored.

The basic diagram of the method is illustrated in FIG. 1 and comprises the following 4 main steps:
Step 1: the extraction of the paths and the evaluation of the criteria;
Step 2: the aggregation of the criteria;
Step 3: the classification of the paths;
Step 4: the reduction of the number of paths.

The tasks of extraction of the paths and classification of the paths are recommended but as an option, as explained hereinbelow.

Step 1: Extraction of the Paths and Evaluation of the Criteria

The first step of the method comprises a description of the circuit in terms of paths of the netlist and values of the criteria.

On the basis of the list of paths of the netlist, the false paths are deleted. A false path is a path of the circuit which will never propagate a signal value and will never be used in the real circuit. The elimination of these false paths is important for performing precise analyses and avoiding losing time in optimizing the paths which are never used. However, the method operates even by considering all the paths of the netlist, therefore the task of extracting the paths is optional.

For each path extracted from the netlist, an evaluation of the selected criteria is performed. The aim is to associate a value with each path for each criterion considered. The estimation of the values is performed by simulation or analysis of the netlist of the circuit and depends on the strategy of high-level analysis of the circuit or the on-line monitoring strategy. For example, by considering the activity criterion, an average value or the maximum value of the paths is characterized.

Arrays are obtained which represent the information necessary for applying the method. For each criterion selected, there is an array which associates the value of the criterion with each path of the netlist. For example as illustrated in FIG. 1, relating to the first criterion c1, a first array associates each path path1, path2, . . . , with a value of first criterion V1c1, V2c1, . . . .

Step 2: Aggregation of the Criteria

The second step takes as input the arrays which associate the values of the criteria $c_1, c_2, \ldots$, with the paths, defined in step 1.

On the basis of several criteria, a formula is applied so as to obtain a unique value for each path.

$$c_a = f(c_1, c_2, \ldots)$$

An aggregation criterion $c_a$ is identified by using a function which performs a correlation between the selected criteria $c_1, c_2, \ldots$.

Examples of aggregation functions are given hereinafter. The chosen aggregation criterion thus defines the behavior of the circuit for which it is desired to select a subset of representative paths.

This step produces a single array which associates the value of the aggregation criterion with each path.

The method performs an operation of aggregating several criteria belonging to different criteria types, so as to allot a unique value for each path of the netlist.

The aggregation is done by using a cost function which performs a correlation of the criteria and calculates an aggregation value for each path. A unique array is obtained, in which each path tagged path is associated with an aggregation criterion value Vi.

Step 3: Classification of the Paths

The third step takes as input the array produced from the aggregation of the criteria. The array contains all the paths of the netlist (except the false paths, which have been deleted in the first step), each of them having an associated value of the aggregation criterion.

The step of classifying the paths performs a sorting of the paths of the netlist. The paths are sorted as a function of the associated value of the aggregation criterion, for example in ascending or descending order.

This step produces a sorted array containing the paths and the associated values. The objective is to accelerate the following step of reducing the paths. An array is obtained in which the values Vi have been ranked.

However, the following step also works when considering an unsorted array, therefore the task of classifying the paths is optional.

Step 4: Reduction of the Number of Paths

The last step takes as input the sorted (or unsorted) array containing the paths and the associated values of the aggregation criterion.

A subset of paths is selected on the basis of a strategy predefined by the circuit designer. A few examples of possible strategies are given hereinafter:

selection based on a threshold value: a threshold value is defined which indicates the extraction of the paths with an associated value which is less than or greater than the specified threshold;

selection based on a maximum deviation value: the paths characterized by a value of the aggregation criterion with a disparity which is less than a predefined threshold with respect to the other paths are extracted;

selection based on an average value: the paths characterized by a value of the aggregation criterion which is close to the average of the values of all the paths are extracted.

The method produces the list of a subset of the selected paths: path k, path k+1.

First Exemplary Implementation of the Method of the Invention

The simplest case of implementation of the method of the invention considers two criteria of two different types.

The following criteria are employed:

the first criterion is the activity and is of usage type. More precisely this may entail for example the activity expressed in terms of Static Probability (SP), which is the fraction of time during which a signal is at 1 or 0. The activity is derived by considering typical cases or poor executions;

the second criterion is the lag of the circuit, that is to say the propagation time of the input data, and is of topology type.

Figure 2:
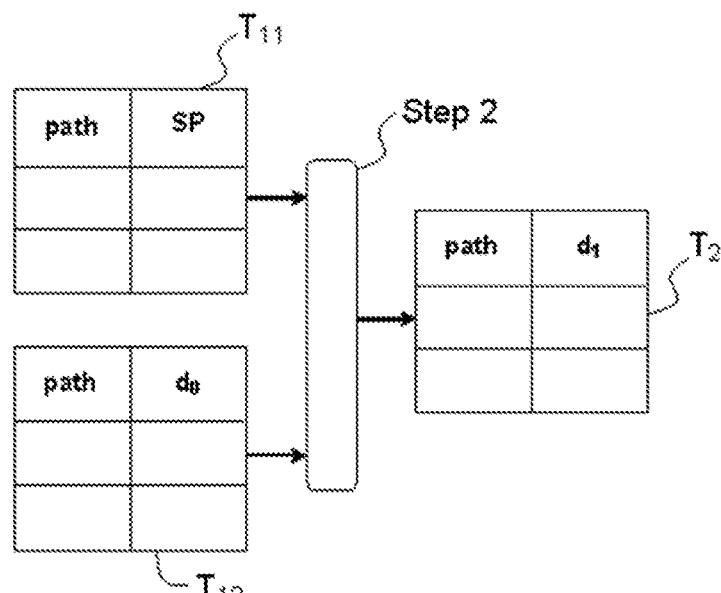
FIG. 2 illustrates a first exemplary implementation of the method of the invention in its step of aggregating the values of criteria.

Two first arrays are thus constructed: each first array cataloging the criterion considered for each of the paths, as illustrated in FIG. 2. A first array T11 associates the paths tagged path, with the criterion tagged SP, a second array T12 associates the paths tagged path, with the criterion tagged d0.

These two criteria are used in the aggregation step to analyze the temporal degradation of the circuit. The data provided are used to study the lag caused by the degradation mechanisms, in particular by the temperature instability mechanism: "Bias Temperature Instability" (BTI), which is related to the SP activity.

The aggregation step applies a formula to obtain the lag $d_1$ of the paths after degradation:

$$d_1 = f(d_0, SP)$$

FIG. 2 thus shows diagrammatically the aggregation step starting from the first arrays T11 and T12, and making it possible to catalog in the second array T2, the values of the aggregation criterion, calculated on the basis of the two types of pre-established criteria. Array T2 thus associates each path tagged path with an aggregation criterion tagged d1.

An exemplary aggregation formula for calculating the lag of a path subject to BTI is the following (C. Sandionigi, O. Heron, C. Bertolini, R. David, When processors get old: Evaluation of BTI and HCl effects on performance and reliability", IEEE On-Line Testing Symposium, 2013, pp. 185-186):

$$d_{path} = d_0 + \Sigma_{gate}(SP_{gate} \cdot POT)$$

with:

POT is the circuit execution time.

$SP_{gate}$ is the Static Probability of the logic gate.

$d_0$ is the initial lag of the path.

$d_{path}$ is the lag of the path after degradation.

An array is obtained where each path of the netlist is characterized by a lag which is the sum of the initial lag and of the delay caused by the degradation mechanism.

Thereafter, the paths are sorted on the basis of the values $d_1$.

A subset is extracted on the basis of the strategy chosen by the circuit designer.

Other metrics can be chosen to estimate the activity of the circuit. For example, the paths can be characterized in terms of "Toggle Rate" TR, which is the rate of change of value of a signal and which therefore constitutes a criterion of interest.

In this case, the data provided are used to estimate the lag caused by the "Hot Carrier Injection" (HCl) degradation mechanism corresponding to the injection of hot carriers, which is related to the TR criterion. The value $d_1$ associated with each path is calculated as a function of this TR criterion.

$$d_1 = f(d_0, TR)$$

An exemplary aggregation formula is obtained by simplifying the formula proposed in the article by C. Bertolini, O. Heron, N. Ventroux, F. Marc, "Relation between HCl-induced performance degradation and applications in a RISC processor", IEEE Int. On-Line Testing Symposium, 2012, pp. 67-72, (Formula 7) doing so in order to calculate the lag of a path subject to the HCl degradation mechanism.

$$d_{path} = d_0 + \Sigma_{gate}(TR_{gate} \cdot POT)$$

Second Exemplary Implementation of the Method of the Invention

This exemplary method introduces a third criterion: sensitivity.

Figure 3:
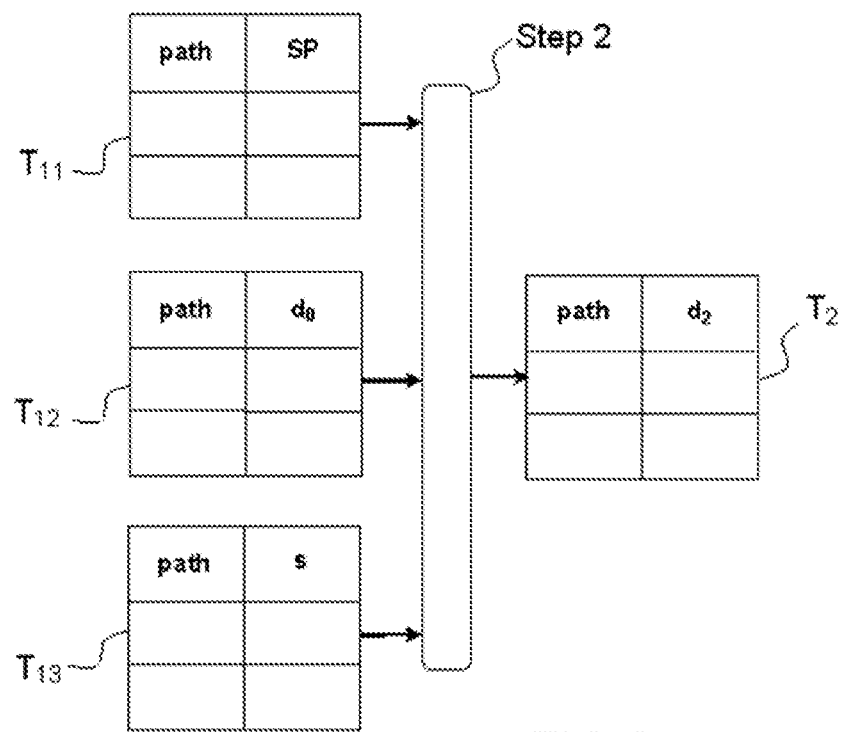
FIG. 3 illustrates a second exemplary implementation of the method of the invention in its step of aggregating the values of criteria.

This criterion is related to the technology used for the realization of the circuit. As illustrated in FIG. 3, a third array T13 cataloging the sensitivity criterion for each of the paths is constructed in the first step.

In this third array, each path is characterized by the sensitivity of the technology on which it is realized.

By virtue of this additional criterion, the aggregation step applies a more precise formula for the calculation of the lag caused by the degradation mechanisms. A lag after degradation $d_2$ is obtained which takes account of the realization technology.

$$d_2 = f(d_0, SP, s)$$

In the formula of the previous example, SP is considered to be activity metric. However, other metrics can be envisaged.

An exemplary aggregation formula for calculating the lag of a path subject to BTI is the following.

$$d_{path} = d_0 + \Sigma_{gate}(s_{gate} \cdot (SP_{gate} \cdot POT))^{n_{BTI}}$$

$n_{BTI}$ is a technology-dependent parameter; this is the time exponent for the BTI mechanism.

An array is obtained where each path of the netlist is characterized by a lag after degradation. This value $d_2$ is more precise than the value $d_1$ since account is taken of the sensitivity of the technology to the degradation mechanism considered. In fact, in the calculation formulae for $d_1$, the technology sensitivity parameter is envisaged as a constant for all the paths.

Finally, the steps of classification and reduction of the paths are performed as described previously.

Third Exemplary Implementation of the Method of the Invention

This example of the method is the most complete since it considers all the types of criteria. The objective is to compare the impact of several applications on the propagation time of the paths of a processor subject to the BTI phenomenon.

There is at least one criterion for each type:

a criterion t for the topology, for example the initial lag of the path with the aid of a temporal static analysis;

a criterion a for the activity, for example the average SP of the logic gates of the path, obtained by executing several applications representative of the targeted domain;

a criterion s for the sensitivity, for example the probability of failure of the path on the basis of the simulation of the temporal degradation of the netlist;

a criterion e for the environment, for example the average temperature of the logic gates of the path with the aid of a temperature simulation tool;

a criterion c for the criticality, for example a value included in a span which indicates the gravity of the failure of the path, obtained by executing an injection of faults and by analyzing the functionality of the circuit.

The aggregation step applies a formula to obtain a value which characterizes the path:

$$v=f(t,a,s,e,c)$$

An exemplary aggregation formula performs the multiplication of all the values:

$$v=t*a*s*e*c$$

In this case, we do not calculate a physical parameter, such as the lag of a path subject to a phenomenon of the previous examples, but we find a value characteristic of the path.

Finally, the steps of classification and reduction of the paths are performed as described previously.

The arrays hereinbelow illustrate the steps described in an example on 5 paths (path1 to path5).

| Step 1 | | | | | | | | | |
| --- | --- | --- | --- | --- | --- | --- | --- | --- | --- |
| path | t | path | a | path | s | path | e | path | c |
| path 1 | 2.1 | path 1 | 0.8 | path 1 | 0.2 | path 1 | 29 | path 1 | 1.0 |
| path 2 | 2.0 | path 2 | 0.4 | path 2 | 0.3 | path 2 | 29 | path 2 | 1.0 |
| path 3 | 1.8 | path 3 | 0.5 | path 3 | 0.2 | path 3 | 30 | path 3 | 0.9 |
| path 4 | 1.6 | path 4 | 0.3 | path 4 | 0.4 | path 4 | 29 | path 4 | 1.0 |
| path 5 | 1.5 | path 5 | 0.9 | path 5 | 0.4 | path 5 | 29 | path 5 | 0.4 |

| Step 2 | |
| --- | --- |
| path | v |
| path 1 | 9.7 |
| path 2 | 6.9 |
| path 3 | 4.8 |
| path 4 | 5.2 |
| path 5 | 6.2 |

| Step 3 | |
| --- | --- |
| path | v |
| path 1 | 9.7 |
| path 2 | 6.9 |
| path 5 | 6.2 |
| path 4 | 5.2 |
| path 3 | 4.8 |

| Step 4 | |
| --- | --- |
| path | v |
| path 1 | 9.7 |
| path 2 | 6.9 |
| path 5 | 6.2 |

The invention claimed is:

1. A method implemented by an integrated circuit analysis computer, for selecting representative paths for analysis of behavior of an integrated circuit according to a predefined analysis strategy, comprising an identification of a set of paths of said integrated circuit having logic gates and construction of a list of the set of said paths, the method further comprising the following steps:

selection with the integrated circuit analysis computer of several criteria related to the behavior of said integrated circuit, said several criteria being chosen from among the following types: topology, usage, sensitivity, environment, and criticality;

determination with the integrated circuit analysis computer of values of the selected criteria for each of said identified paths;

application of a correlation function with the integrated circuit analysis computer so as to aggregate the set of said values of criteria in such a way as to define for each of said paths, an aggregation criterion value;

selection with the integrated circuit analysis computer of a subset of representative paths from among the list of the set of said paths, as a function of the value of the aggregation criterion of each of said paths and of the predefined analysis strategy; and designing, monitoring, and/or measuring performance of an integrated circuit with the integrated circuit analysis computer based on the selected subset of representative paths for development and production of an integrated circuit, and monitoring of the produced integrated circuit.

2. The method as claimed in claim 1, wherein the selection of a subset of representative paths is based on a threshold value, indicating the paths to be extracted with an associated value which is less than or greater than a specified threshold value.

3. The method as claimed in claim 1, wherein the selection of a subset of representative paths is based on a maximum deviation value, indicating the paths to be extracted which have an aggregation value with a disparity which is less than a predefined threshold value with respect to the other paths.

4. The method as claimed in claim 1, wherein the selection of a subset of representative paths is based on an average value, indicating the paths to be extracted which have an aggregation value which are closer to the average of the values of all the paths.

5. The method as claimed in claim 1, wherein the determination of the criterion values for each of said paths is carried out by simulation of said integrated circuit.

6. The method as claimed in claim 1, wherein the determination of the criterion values for each of said paths is carried out by analysis of said circuit.

7. The method as claimed in claim 1, wherein the criteria of topology type can be chosen from among: the lag of the circuit corresponding to the propagation time of the input data, or the performance.

8. The method as claimed in claim 1, wherein the criteria of usage type can be chosen from among: the activity in terms of fraction of time during which a signal is at 1, the activity in terms of fraction of time during which a signal is at 0, in terms of number of switchings of the signal, or the power.

9. The method as claimed in claim 1, wherein the criteria of sensitivity type can be chosen from among: the probability of failure of the logic gates or the technological parameters related to the degradation of the gates.

10. The method as claimed in claim 1, wherein the criteria of environment type can be chosen from among: the temperature of the environment or the exposure to radiations.

11. The method as claimed in claim 1, comprising the application of a correlation function of the predefined criteria, so as to determine said value of the aggregation criterion, said correlation function being a function for calculating the lag of the paths subject to thermal degradation mechanisms.

12. The method as claimed in claim 1, comprising a step of selecting false paths implemented prior to the step of the selection of several criteria, said false paths corresponding to paths being unable to propagate a signal.

13. The method as claimed in claim 1 wherein the method is utilized for monitoring of the behavior of an integrated circuit.

14. A computer program comprising instructions for the execution of the method implemented by computer as claimed in claim 1.

15. A non-transitory computer program product comprising instructions executed by an integrated circuit analysis computer, for selecting representative paths for analysis of behavior of an integrated circuit according to a predefined analysis strategy, comprising an identification of the set of paths of said integrated circuit having logic gates and construction of a list of the set of said paths, the non-transitory computer program product instructions comprising:

selection with the integrated circuit analysis computer of several criteria related to the behavior of said integrated circuit, said several criteria being chosen from among the following types: topology, usage, sensitivity, environment, and criticality;

determination with the integrated circuit analysis computer of values of the selected criteria for each of said identified paths;

application of a correlation function with the integrated circuit analysis computer so as to aggregate the set of said values of criteria in such a way as to define for each of said paths, an aggregation criterion value;

selection with the integrated circuit analysis computer of a subset of representative paths from among the list of the set of said paths, as a function of the value of the aggregation criterion of each of said paths and of the predefined analysis strategy; and designing, monitoring, and/or measuring performance of an integrated circuit with the integrated circuit analysis computer based on the selected subset of representative paths for development and production of an integrated circuit, and monitoring of the produced integrated circuit.

16. The non-transitory computer program product as claimed in claim 15, wherein the selection of a subset of representative paths is based on a threshold value, indicating the paths to be extracted with an associated value which is less than or greater than a specified threshold value.

17. The non-transitory computer program product as claimed in claim 15, wherein the selection of a subset of representative paths is based on a maximum deviation value, indicating the paths to be extracted which have an aggregation value with a disparity which is less than a predefined threshold value with respect to the other paths.

18. The non-transitory computer program product as claimed in claim 15, wherein the selection of a subset of representative paths is based on an average value, indicating the paths to be extracted which have an aggregation value which are closer to the average of the values of all the paths.

19. The non-transitory computer program product as claimed in claim 15, wherein the determination of the criterion values for each of said paths is carried out by simulation of said integrated circuit.

20. The non-transitory computer program product as claimed in claim 15, wherein the determination of the criterion values for each of said paths is carried out by analysis of said circuit.

* * * * *